(12) United States Patent
Baumgart

(10) Patent No.: US 8,077,952 B2
(45) Date of Patent: Dec. 13, 2011

(54) PRECOMPUTED AUTOMATIC PIXEL SHIFT FOR REVIEW OF DIGITAL SUBTRACTED ANGIOGRAPHY

(75) Inventor: John Baumgart, Hoffman Estates, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1181 days.

(21) Appl. No.: 11/779,491

(22) Filed: Jul. 18, 2007

(65) Prior Publication Data

US 2008/0037844 A1 Feb. 14, 2008

Related U.S. Application Data

(60) Provisional application No. 60/837,893, filed on Aug. 14, 2006.

(51) Int. Cl.
*G06K 9/00* (2006.01)
(52) U.S. Cl. ........................................ 382/130
(58) Field of Classification Search .......... 382/130, 382/131, 132, 128
See application file for complete search history.

(56) References Cited

U.S. PATENT DOCUMENTS

| | | |
|---|---|---|
| 4,559,557 A | 12/1985 | Keyes et al. |
| 4,870,692 A | 9/1989 | Zuiderveld et al. |
| 5,048,103 A * | 9/1991 | Leclerc et al. ............ 382/294 |
| 5,690,106 A * | 11/1997 | Bani-Hashemi et al. ..... 600/425 |
| 5,848,121 A | 12/1998 | Gupta et al. |
| 2005/0111719 A1 | 5/2005 | Pescatore et al. |
| 2005/0165292 A1 | 7/2005 | Simon et al. |
| 2005/0203373 A1 | 9/2005 | Boese et al. |

OTHER PUBLICATIONS

Siemens Operator Manual vol. 2, Axiom Artis, cover page and pp. 81-87, 2004.
Physics of Medical X-Ray Imaging, Chapter 10—Digital Subtraction Angiography (DSA), downloaded from http://ric.uthscsa.edu/personalpages/lancaste/DI-II_Chapters/DI_chap10.pdf on Jul. 5, 2007.

* cited by examiner

*Primary Examiner* — Claire X Wang
(74) *Attorney, Agent, or Firm* — Alexander J Burke

(57) ABSTRACT

Disclosed are method and apparatus for motion correction of Digital Subtracted Angiography (DSA) images. Prior to display of DSA image frames, a pixel shift vector is calculated for each fill frame. For a fill frame in which a pixel shift vector cannot be directly calculated, an approximate pixel shift vector is interpolated between, or extrapolated from, other pixel shift vectors. A mask frame is shifted by a pixel shift vector. The resulting shifted mask frame is subtracted from the corresponding fill frame to generate a motion-corrected subtracted frame, which is then displayed on a video display. Motion correction is performed prior to diagnostic review.

26 Claims, 5 Drawing Sheets

PRECOMPUTED AUTOMATIC PIXEL SHIFT FOR REVIEW OF DIGITAL SUBTRACTED ANGIOGRAPHY

This application claims the benefit of U.S. Provisional Patent Application Ser. No. 60/837,893, filed on Aug. 14, 2006, which is incorporated herein by reference.

FIELD OF THE INVENTION

The present invention relates generally to medical imaging, and more particularly to digital subtracted angiography.

BACKGROUND

X-Ray angiography is a medical imaging technique for diagnosing disorders related to blood vessels. In this technique, a two-dimensional X-Ray image is taken of the region of interest. In general, the X-Ray contrast between the blood vessels and surrounding tissue and bone structures is weak. To enhance the X-Ray contrast, a dye is injected into the blood stream. Since the opacity of the dye is higher than that of the surrounding structures, the contrast in the dye-enhanced image is increased. The resulting contrast, however, is still often too low for detailed diagnostics.

Further contrast enhancement is provided by digital subtraction angiography (DSA). In this technique, a digital background image of the region of interest prior to injection of dye is captured and stored in an image processing system. The dye is then injected, and digital dye-enhanced images are captured and stored as the dye flows through the blood vessels. The images of the blood vessels are enhanced by subtracting the digital background image from the digital dye-enhanced images. The resulting differential images (called subtracted images) are high-contrast images of the blood vessels.

In an ideal test environment, the digital background image prior to injection of dye is identical to the image of the surrounding structures after introduction of dye. In an actual test environment, however, the patient moves during the time in which the images are acquired. Consequently, the digital background image is not identical to the digital image of the surrounding structures after the introduction of dye. The resulting contrast is then lower than in the ideal case. Prior to digital image subtraction, the dye-enhanced images need to be corrected for patient motion.

In common embodiments of DSA processing, motion correction is performed by the user at the time the images are being reviewed for diagnostics. This procedure extends diagnostic time, and interrupts diagnostic review. What is needed is a method for correcting the images prior to diagnostic review.

SUMMARY

Embodiments of the invention provide an improved technique for motion correction of uncorrected subtracted frames. Prior to display of the uncorrected subtracted frames, a shifted mask frame is generated for each of a plurality of fill frames. The shifted mask frame is subtracted from the corresponding fill frame to generate a motion-corrected subtracted frame. In one embodiment for generating a shifted mask frame, a pixel shift vector is directly calculated for each fill frame. For a fill frame in which a pixel shift vector cannot be directly calculated, an approximate pixel shift vector is interpolated between, or extrapolated from, other pixel shift vectors. A shifted mask frame is generated by shifting a fixed reference mask frame by a pixel shift vector. Motion correction is completed prior to diagnostic review.

These and other advantages will be apparent to those of ordinary skill in the art by reference to the following detailed description and the accompanying drawings.

DETAILED DESCRIPTION

Figure 1:
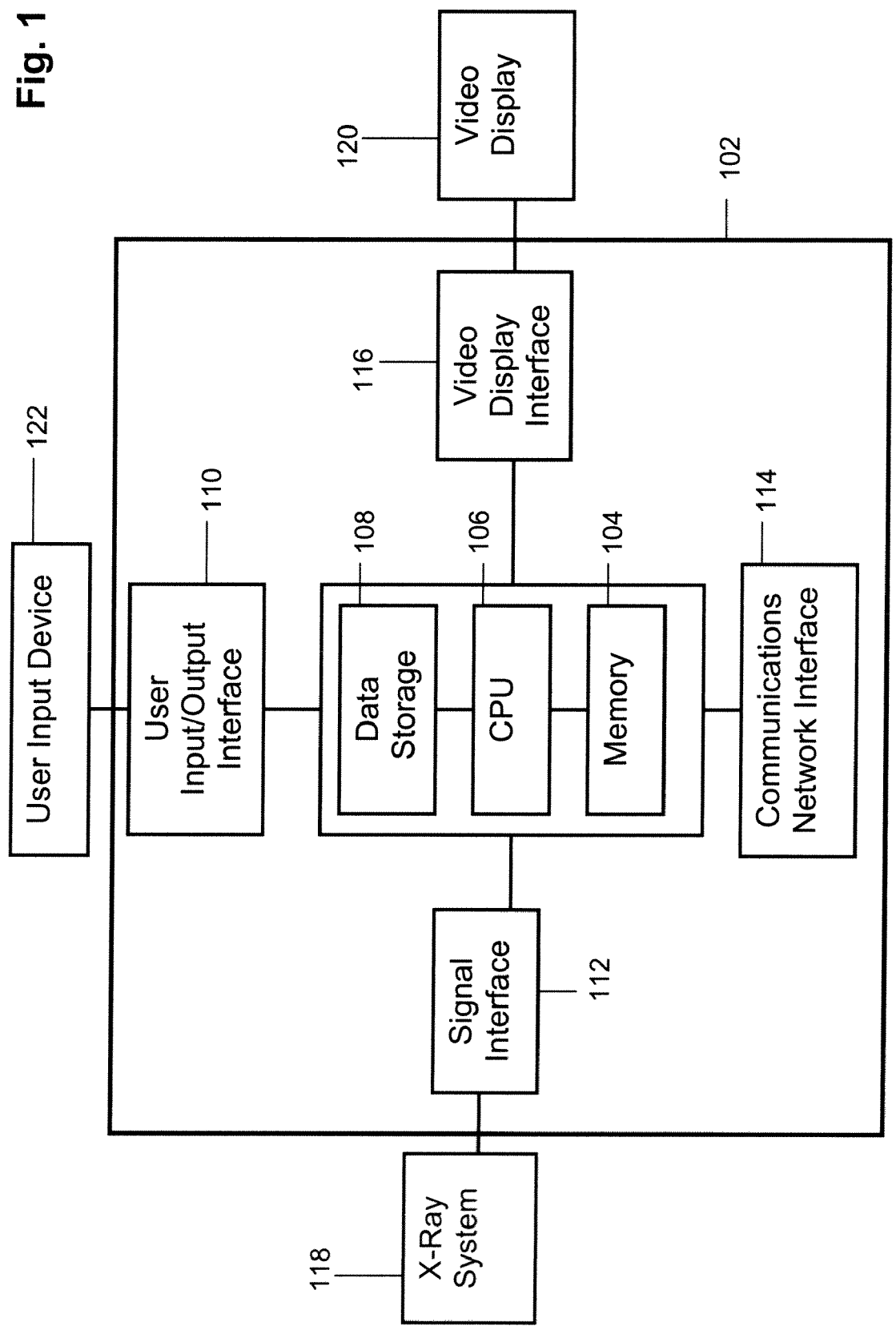
FIG. 1 shows a high-level block diagram of a system for processing of and display of DSA images in accordance with an embodiment of the present invention.

FIG. 1 is a high-level block diagram of a system for acquiring, processing, and displaying DSA images. The system comprises X-Ray system 118, image processing system 102, video display 120, and user input device 122. Details of image processing system 102 are described below. Data from X-Ray system 118 are transmitted to image processing system 102 across signal interface 112. Image processing system 102 processes the input signals and outputs DSA images to video display 120 across video display interface 116. User input device 122 inputs commands to image processing system 102 across user input/output interface 110.

Figure 2:
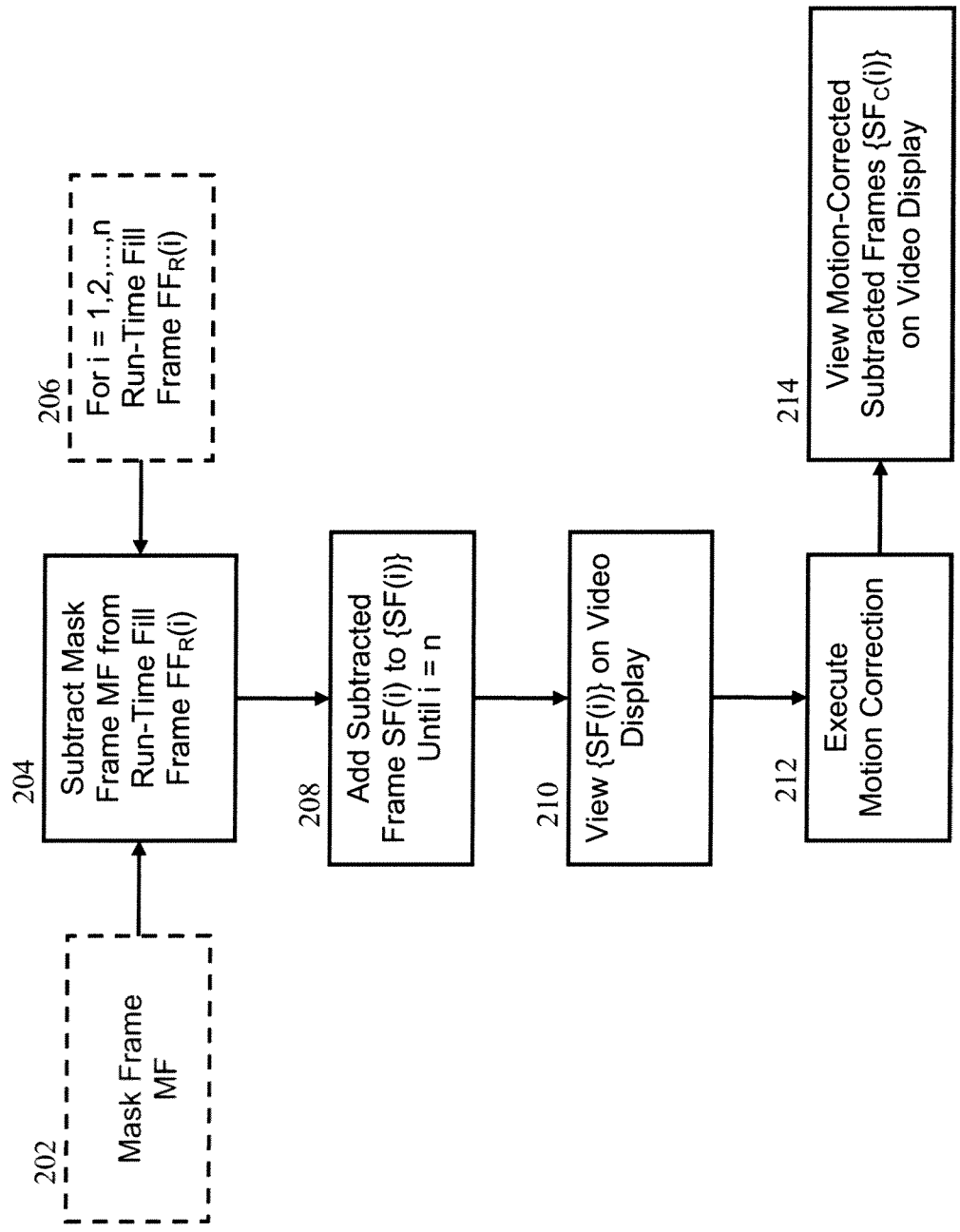
FIG. 2 shows a flowchart for a prior art method of motion correction of DSA images.

FIG. 2 shows a flowchart of an embodiment of an existing method for generating and viewing motion-corrected DSA images. A single image is captured as a digital image frame. A diagnostic run generates a sequence of digital image frames. Herein, a "run-time process" refers to a process which is executed during acquisition of X-Ray data. Step 204 receives two inputs. The first is mask frame (MF) 202. Herein, "mask frame" refers to a reference frame of the region of interest prior to injection of dye. The mask frame may be selected from a series of digital image frames according to various criteria. For example, X-Ray system 118 may select a mask frame after the intensity of the X-Ray source has stabilized. A single mask frame is fixed during a designated diagnostic run.

The other input to step 204 is a run-time fill frame 206, $FF_R(i)$, where i=1,2, ... n, and n=number of frames in the diagnostic run. Herein, "fill frame" refers to a digital image frame captured after dye injection. In step 204, MF 202 is subtracted from $FF_R(i)$ 206. In step 208, the resulting run-time subtracted frame SF(i) is added to a set of subtracted frames {SF(i)} stored in image processing system 102. Steps 204 and 208 are iterated for i=1,2, ... n. After completion of the iterations, the complete set of subtracted frames {SF(i)} is available for viewing. In step 210, a user views {SF(i)} on video display 120. The user may view a single frame or a sequence of frames. Note that {SF(i)} is not corrected for motion. Herein, {SF(i)} is referred to as a set of "uncorrected" subtracted frames.

In step 212, the user issues commands to image processing system 102 via a user input device 122, such as a keyboard or mouse, across user input/output interface 110. These commands instruct image processing system 102 to execute a motion-correction algorithm to {SF(i)}. Various motion-correction algorithms, for example, bilinear interpolation of sub-pixel values, may be employed. In step 214, the user views the set of motion-corrected subtracted frames, herein referred to as {$SF_C(i)$}, on video display 120. In this procedure, diagnostic review is interrupted because the user first views the uncorrected subtracted frames {SF(i)} in step 210, manually enters commands to correct the frames in step 212, and then views the motion-corrected subtracted frames {$SF_C(i)$} in step 214.

Figure 3:
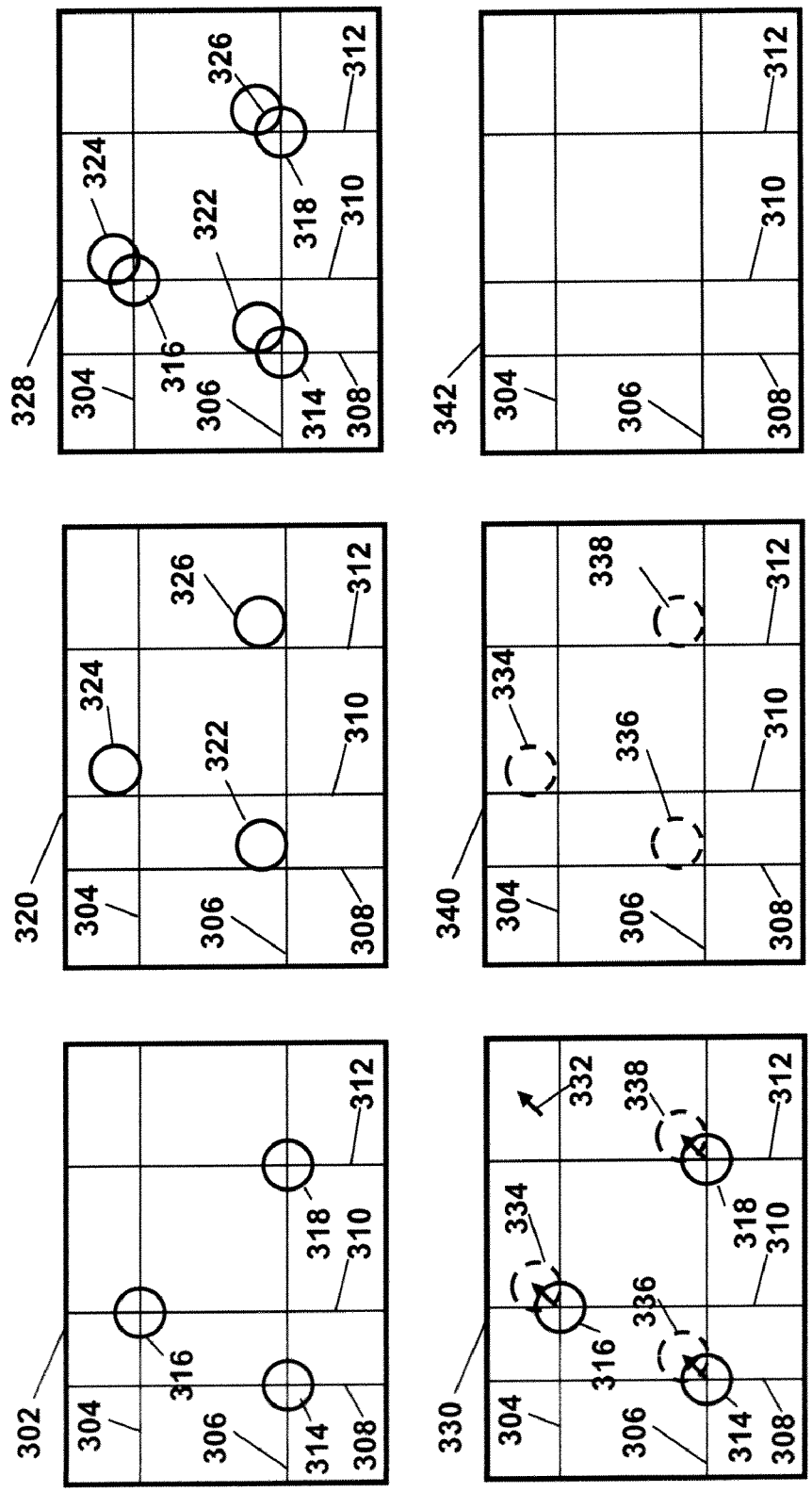
FIG. 3 shows a graphical representation of a process for generation and application of shifted mask frames in accordance with an embodiment of the present invention.

An embodiment of the invention uses shifted mask frames for motion correction. FIG. 3 shows a graphical representation of a process for generation and application of shifted mask frames. Frame 302 represents a mask frame. Lines 304-312 are reference lines. Circles 314-318 represent background structures in the region of interest prior to dye injection. To simplify the figures, graphical representations of blood vessels are not shown. Frame 320 represents a fill frame after dye injection. Circles 322-326 in fill frame 320 correspond to the same background structures as circles 314-318 in mask frame 302. Due to patient motion, however, circles 322-326 are not aligned with circles 314-318. Frame 328 represents an uncorrected subtracted frame resulting from subtracting mask frame 302 from fill frame 320. Since the two sets of circles are not properly aligned, the background structures are not removed, except in regions in which circles intersect.

Frame 330 represents a process for generating a shifted mask frame. A motion-detection algorithm has determined that in the interval between acquisition of mask frame 302 and acquisition of fill frame 320, the patient has shifted by a constant translation vector 332. Embodiments of the invention may employ various motion-detection algorithms. To generate a shifted mask frame, the circles 314-318 are shifted by the constant translation vector 332. Embodiments of the invention may employ various algorithms for generating the translation vector and shifting the mask frame. In general, a translation vector may be calculated from a difference between a representation of a fill frame and a representation of a mask. Herein, a "representation of a fill frame" comprises a fill frame as captured, and a fill frame which has been processed. For example, a representation of a fill frame may be a fill frame which has been filtered to reduce background noise. A representation of a mask is similarly defined. In one embodiment, a translation vector may be generated by subtracting a mask frame from a fill frame. Alternatively, a translation vector may also be generated by subtracting a fill frame from a mask frame.

The shifted circles are represented by the dashed circles 334-338. Frame 340 represents the shifted mask frame. The shifted circles 334-338 are now properly aligned with corresponding circles 322-326 in fill frame 320. Frame 342 represents a motion-corrected subtracted frame resulting from subtracting the shifted mask frame 340 from the fill frame 320. The background structures have now been removed. In the embodiment described above, motion correction was performed for a constant translation. One skilled in the art may apply similar techniques to correct for other motions, such as rotation or distortion. In the embodiment described above, the mask frame was shifted to align the mask frame with a fill frame. In other embodiments, a fill frame may be shifted to align the fill frame with a mask frame.

Figure 4:
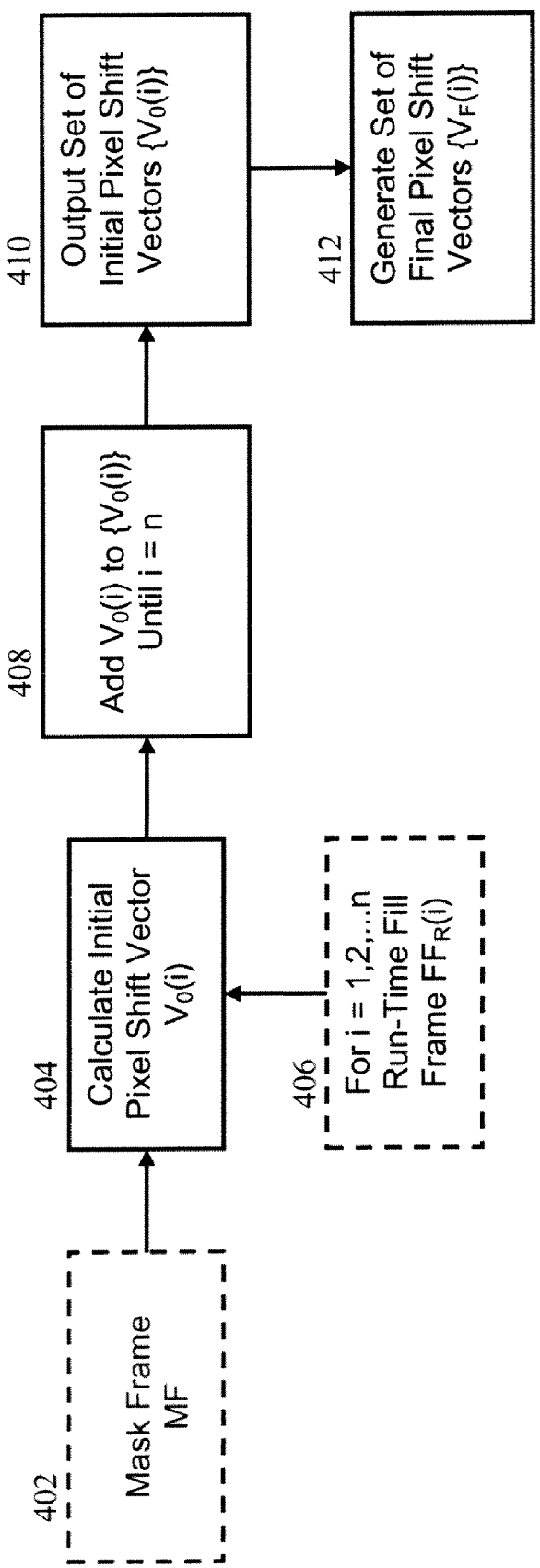
FIG. 4 shows a flowchart for run-time generation of pixel shift vectors in accordance with an embodiment of the present invention.
Figure 5:
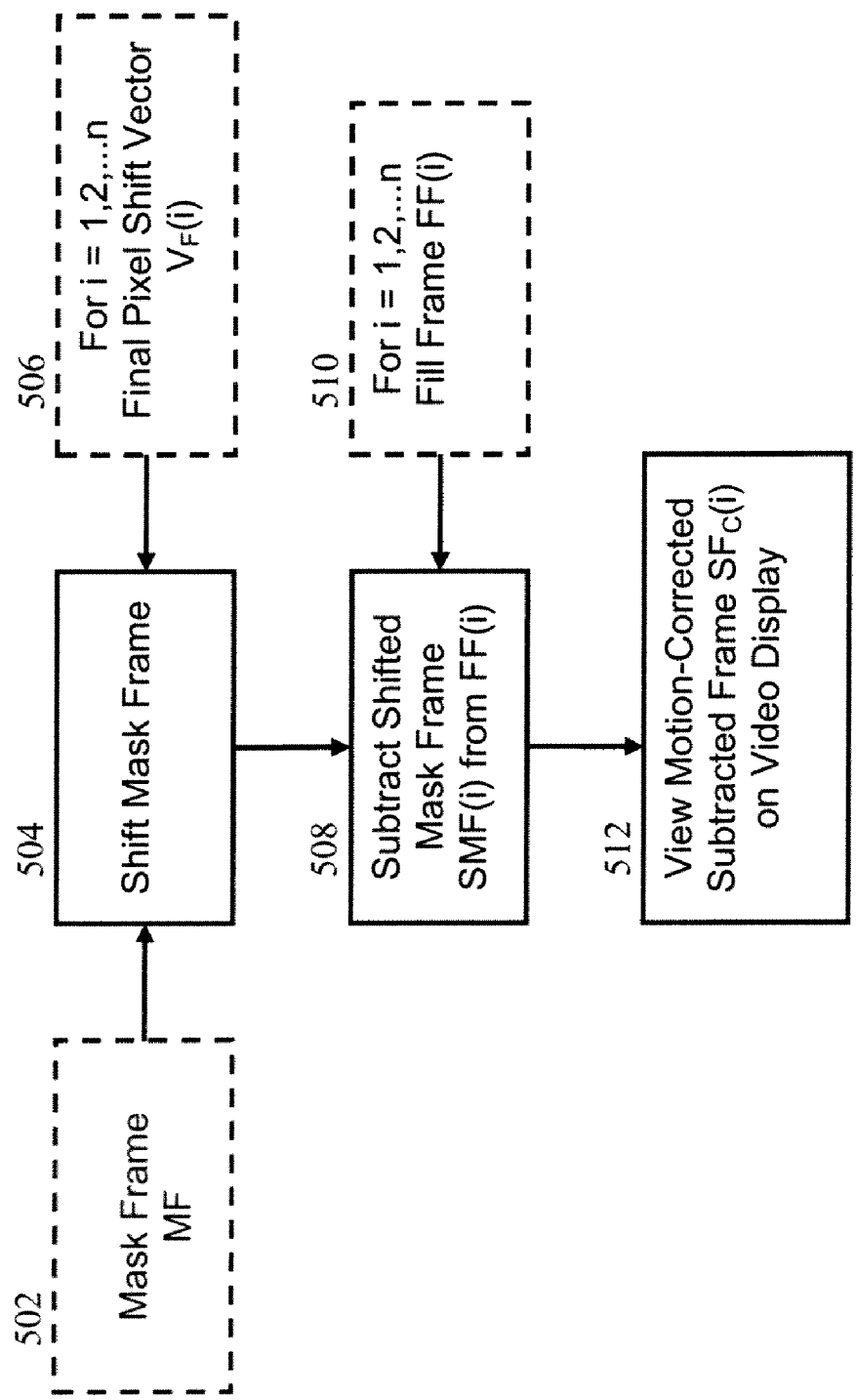
FIG. 5 shows a flowchart for generating and displaying motion-corrected subtracted frames in accordance with an embodiment of the present invention.

FIGS. 4 and 5 show flowcharts of an embodiment of the invention for motion correction of DSA images prior to diagnostic review. The process comprises two phases. In the first phase, shown in FIG. 4, a set of pixel shift vectors are generated during run time. In the second phase, shown in FIG. 5, the set of pixel shift vectors are used to generate and display motion-corrected subtracted frames. In this process, motion correction is automatically executed prior to diagnostic review. The user does not need to first view an uncorrected subtracted frame and then manually execute motion correction.

1 In FIG. 4, step 404 receives two inputs. The first is a mask frame (MF) 402. MF 402 is fixed for all fill frames in a diagnostic run. The other input to step 404 is a run-time fill frame 406, $FF_R(i)$, where i=1,2, . . . n, and n=number of frames in the diagnostic run. In step 404, an initial pixel shift vector is calculated. In step 408 the resulting initial pixel shift vector $V_0(i)$ is added to a set of initial pixel shift vectors {$V_0(i)$} stored in image processing system 102. Steps 404 and 408 are iterated for i=1,2, . . . n. After completion of the iterations, the complete set of initial pixel shift vectors {$V_0(i)$} is outputted in step 410. In an advantageous embodiment, {$V_0(i)$} is generated during run time. This reduces the delay between the time of image acquisition and the time of diagnostic review. In other embodiments, {$V_0(i)$} may be generated after run time.

In some instances, a value of $V_0(i)$ may not be able to be calculated during run time; for example, if $FF_R(I)$ is too blurry, or if the time interval between two successive frames is too short for the calculation to be executed during run time. In these instances, the values are recorded as unknown vectors $U_0(i)$. In general, the motion between two successive frames is not abrupt. Approximate values of the unknown vectors $U_0(i)$ may be generated from the set of known values of $V_0(i)$. Various methods may be used for generating the approximate values. For example, the unknown values may be replaced by approximate values generated by interpolation or extrapolation of known values of $V_0(i)$. Various curve fitting methods (for example, linear, quadratic, or higher-order polynomial) may be used for interpolation and extrapolation. For example, if the set of initial pixel shift vectors is {$V_0(i)$}={$V_0(1)$, $V_0(2)$, $U_0(3)$, $V_0(4)$, $V_0(5)$, $V_0(6)$, $U_0(7)$}, then the unknown value $U_0(3)$ may be approximated by linear interpolation between $V_0(2)$ and $V_0(4)$. Similarly, the unknown value $U_0(7)$ may be approximated by linear extrapolation from $V_0(5)$ and $V_0(6)$. In step 412, the final set of pixel shift vectors {$V_F(i)$} is generated. In this example, {$V_F(i)$}={$V_0(1)$, $V_0(2)$, I(3), $V_0(4)$, $V_0(5)$, $V_0(6)$, E(7)}, where I(3) is a value interpolated between $V_0(2)$ and $V_0(4)$, and E(7) is a value extrapolated from $V_0(5)$ and $V_0(6)$. Herein, values of $V_F(i)$ which are directly calculated during run time are referred to as "prior-generated pixel shift vectors." Approximate values of $V_F(i)$ may be calculated from "prior-generated pixel shift vectors." For example, approximate values of $V_F(i)$ may be interpolated between, or extrapolated from, "prior-generated pixel shift vectors."

FIG. 5 shows a procedure for generating motion-corrected subtracted frames, using the final set of pixel shift vectors {$V_F(i)$}. Step 504 has two inputs. The first is the mask frame MF 502, which is the same as the mask frame MF 402. The second is a final pixel shift vector $V_F(i)$ 506 corresponding to fill frame FF(i) 510. In step 504, the mask frame MF 502 is shifted by the final pixel shift vector $V_F(i)$. The resulting shifted mask frame SMF(i) is one input to step 508. A second input to step 508 is the corresponding fill frame FF(i) 510. Here, FF(i) is the stored value of $FF_R(i)$ previously acquired during run time. In step 508, the shifted mask frame SMF(i) is subtracted from FF(i). The resulting frame is a motion-corrected subtracted frame $SF_C(i)$. In step 512, the user views $SF_C(i)$ on video display 120. No user intervention is needed. Diagnostic review may be performed either in a single-frame mode or in a streaming mode.

In another embodiment, the entire set of motion-corrected subtracted frames $\{SF_C(i)\}$ may be generated prior to diagnostic review. In this embodiment, steps 504 and 508 are iterated for i=1,2, . . . n. At the end of each iteration, $SF_C(i)$ is added to a set of motion-corrected subtracted frames $\{SF_C(i)\}$ stored in image processing system 102. After completion of the iterations, the complete set of motion-corrected subtracted frames $\{SF_C(i)\}$ is available for display. Again, motion-correction is performed prior to diagnostic review.

One embodiment of an image processing system which performs DSA image processing may be implemented using a computer. As shown in FIG. 1, computer 102 may be any type of well-known computer comprising a central processing unit (CPU) 106, memory 104, data storage 108, and user input/output interface 110. Data storage 108 may comprise a hard drive or non-volatile memory. User input/output interface 110 may comprise a connection to a keyboard or mouse. As is well known, a computer operates under control of computer software which defines the overall operation of the computer and applications. CPU 106 controls the overall operation of the computer and applications by executing computer program instructions which define the overall operation and applications. The computer program instructions may be stored in data storage 108 and loaded into memory 104 when execution of the program instructions is desired. Computer 102 may further comprise a communications network interface 114, signal interface 112, and video display interface 116. Signal interface 112 may transform incoming signals to signals capable of being processed by CPU 106. Video display interface 116 may transform signals from CPU 106 to signals which may drive a video controller. Communications network interface 114 may comprise a connection to an Internet Protocol (IP) network. Computers are well known in the art and will not be described in detail herein.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for motion correction of a plurality of uncorrected subtracted medical image frames, comprising the steps of:
acquiring a sequence of image frames of vessels including frames acquired before and after introduction of contrast agent to patient vessels;
generating, without display of said uncorrected subtracted frames, a plurality of shifted 2D (two dimensional) mask frames by translational shift of a mask frame acquired in the absence of contrast agent and by
generating a plurality of motion correction translation vectors individually corresponding to one of a corresponding plurality of 2D fill frames, the generated shifted 2D mask frames each corresponding to one of a plurality of 2D fill frames displaying contrast agent; and,
generating, without display of said uncorrected subtracted frames, a plurality of motion-corrected subtracted frames by subtracting from each of said plurality of 2D fill frames, a corresponding shifted mask frame generated by applying a corresponding motion correction translation vector to the whole mask frame; and
displaying said plurality of motion-corrected subtracted frames.

2. The method of claim 1, wherein the step of generating a plurality of shifted mask frames comprises the step of:
generating at least one of said plurality of motion correction translation vectors of a particular frame by approximation using vectors from frames adjacent said particular frame.

3. The method of claim 1, wherein the step of generating said plurality of motion correction translation vectors comprises the step of calculating a difference between a representation of a mask frame and a representation of each of said plurality of 2D fill frames.

4. The method of claim 3, wherein the step of calculating a difference between a representation of a mask frame and a representation of each of said plurality of 2D fill frames comprises the step of subtracting a mask frame from each of said plurality of 2D fill frames.

5. The method of claim 3, wherein the step of calculating a difference between a representation of the mask frame and a representation of each of said plurality of 2D fill frames comprises the step of subtracting each of said plurality of 2D fill frames from a mask frame.

6. The method of claim 2, wherein the step of generating said plurality of motion correction translation vectors comprises the step of calculating a plurality of pixel shift vectors from a prior-generated plurality of pixel shift vectors individually corresponding to individual frames of a corresponding plurality of 2D fill frames.

7. The method of claim 6, wherein the step of calculating said plurality of motion correction translation vectors from a prior-generated plurality of pixel shift vectors comprises the step of interpolating using a prior-generated plurality of pixel shift vectors individually corresponding to individual frames of a corresponding plurality of 2D fill frames.

8. The method of claim 6, wherein the step of calculating said plurality of motion correction translation vectors from a prior-generated plurality of pixel shift vectors comprises the step of extrapolating using a prior-generated plurality of pixel shift vectors individually corresponding to individual frames of a corresponding plurality of 2D fill frames.

9. The method of claim 2, wherein the step of generating a plurality of 2D shifted mask frames is performed during run time.

10. The method of claim 2, wherein the steps of generating a plurality of motion correction translation vectors and a plurality of motion-corrected subtracted frames are performed during run time.

11. An image processing system for motion correction of a plurality of uncorrected subtracted medical image frames, comprising:
means for generating, without display of said uncorrected subtracted frames, a plurality of shifted 2D (two dimensional) mask frames by translational shift of a mask frame acquired in the absence of contrast agent and by generating a plurality of motion correction translation vectors individually corresponding to one of a corresponding plurality of 2D fill frames, each of the shifted 2D mask frames corresponding to one of a plurality of 2D fill frames displaying contrast agent;

means for generating, without display of said uncorrected subtracted frames, a plurality of motion-corrected subtracted frames by subtracting from each of said plurality of 2D fill frames, a corresponding shifted mask frame generated by applying a corresponding motion correction translation vector to the whole mask frame; and means for displaying said plurality of motion-corrected subtracted frames.

12. The image processing system of claim 11, further comprising:

means for generating at least one of said plurality of motion correction translation vectors of a particular frame by approximation using vectors from frames adjacent said particular frame.

13. The image processing system of claim 11, further comprising:

means for generating said plurality of motion correction translation vectors by calculating a difference between a representation of a mask frame and a representation of each of said plurality of 2D fill frames.

14. The image processing system of claim 13, further comprising:

means for calculating a difference between a representation of a mask frame and a representation of each of said plurality of 2D fill frames by subtracting a mask frame from each of said plurality of 2D fill frames.

15. The image processing system of claim 13, further comprising:

means for calculating a difference between a representation of a mask frame and a representation of each of said plurality of 2D fill frames by subtracting each of said plurality of 2D fill frames from a mask frame.

16. The image processing system of claim 12, further comprising:

means for generating said plurality of motion correction translation vectors by calculating a plurality of pixel shift vectors from a prior-generated plurality of pixel shift vectors individually corresponding to individual frames of a corresponding plurality of 2D fill frames.

17. The image processing system of claim 16, further comprising:

means for calculating said plurality of motion correction translation vectors from a prior-generated plurality of pixel shift vectors by interpolating using a prior-generated plurality of pixel shift vectors individually corresponding to individual frames of a corresponding plurality of 2D fill frames.

18. The image processing system of claim 16, further comprising:

means for calculating said plurality of motion correction translation vectors from a prior-generated plurality of pixel shift vectors by extrapolating a prior-generated plurality of pixel shift vectors individually corresponding to individual frames of a corresponding plurality of 2D fill frames.

19. A non-transitory computer readable medium storing computer program instructions for motion correction of a plurality of uncorrected subtracted medical image frames, said computer instructions defining the steps of:

generating, without display of said uncorrected subtracted frames, a plurality of shifted 2D (two dimensional) mask frames by translational shift of a mask frame acquired in the absence of contrast agent and by generating a plurality of motion correction translation vectors individually corresponding to one of a corresponding plurality of 2D fill frames, each of the shifted 2D mask frames corresponding to one of a plurality of 2D fill frames displaying contrast agent;

generating, without display of said uncorrected subtracted frames, a plurality of motion-corrected subtracted frames by subtracting from each of said plurality of 2D fill frames, a corresponding shifted mask frame generated by applying a corresponding motion correction translation vector to the whole mask frame; and displaying said plurality of motion-corrected subtracted frames.

20. The computer readable medium of claim 19, wherein said computer instructions defining the step of generating a plurality of shifted mask frames further comprise computer program instructions defining the step of:

generating at least one of said plurality of motion correction translation vectors of a particular frame by approximation using vectors from frames adjacent said particular frame.

21. The computer readable medium of claim 19, wherein said computer instructions defining the step of generating said plurality of motion correction translation vectors further comprise computer program instructions defining the step of calculating a difference between a representation of a mask frame and a representation of each of said plurality of 2D fill frames.

22. The computer readable medium of claim 21, wherein said computer instructions defining the step of calculating a difference between a representation of a mask frame and a representation of each of said plurality of 2D fill frames further comprise computer program instructions defining the step of subtracting a mask frame from each of said plurality of 2D fill frames.

23. The computer readable medium of claim 21, wherein said computer instructions defining the step of calculating a difference between a representation of a mask frame and a representation of each of said plurality of 2D fill frames further comprise computer program instructions defining the step of subtracting each of said plurality of 2D fill frames from a mask frame.

24. The computer readable medium of claim 19, wherein said computer instructions defining the step of generating said plurality of motion correction translation vectors further comprise computer program instructions defining the step of calculating a plurality of pixel shift vectors from a prior-generated plurality of pixel shift vectors individually corresponding to individual frames of a corresponding plurality of 2D fill frames.

25. The computer readable medium of claim 24, wherein said computer instructions defining the step of generating said plurality of motion correction translation vectors further comprise computer program instructions defining the step of interpolating using a prior-generated plurality of pixel shift vectors individually corresponding to individual frames of a corresponding plurality of 2D fill frames.

26. The computer readable medium of claim 24, wherein said computer instructions defining the step of generating said plurality of motion correction translation vectors further comprise computer program instructions defining the step of extrapolating using a prior-generated plurality of pixel shift vectors individually corresponding to individual frames of a corresponding plurality of 2D fill frames.

* * * * *